Aug. 28, 1956 — R. M. BEAK — 2,760,793
FACE SEAL
Filed May 11, 1953 — 2 Sheets-Sheet 1
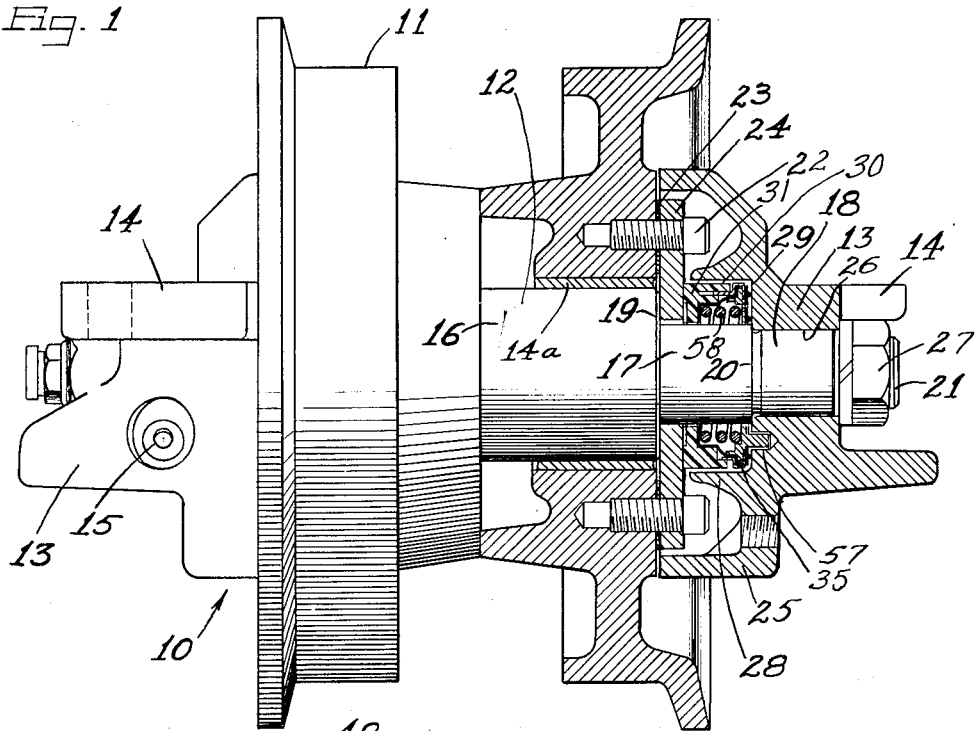
Fig. 1
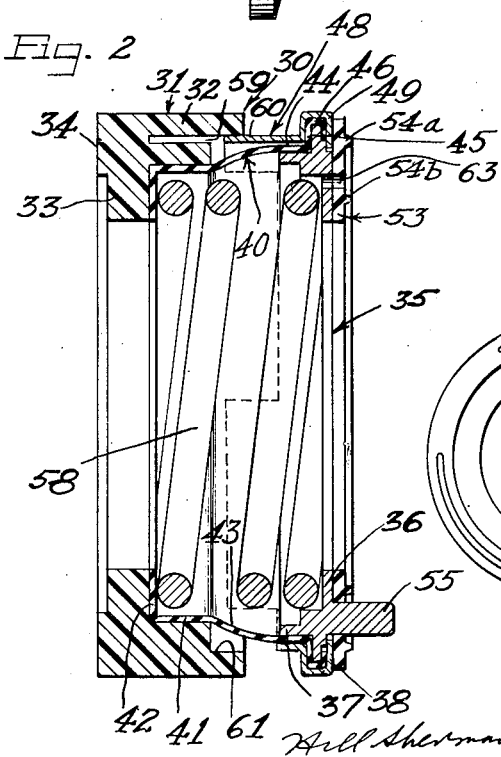
Fig. 2
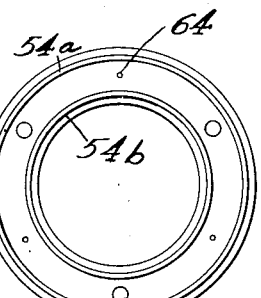
Fig. 3
Fig. 4
Inventor
Robert M. Beak
By Hill Sherman Meroni Gross & Simpson
Attys Aug. 28, 1956  R. M. BEAK  2,760,793
FACE SEAL
Filed May 11, 1953  2 Sheets-Sheet 2
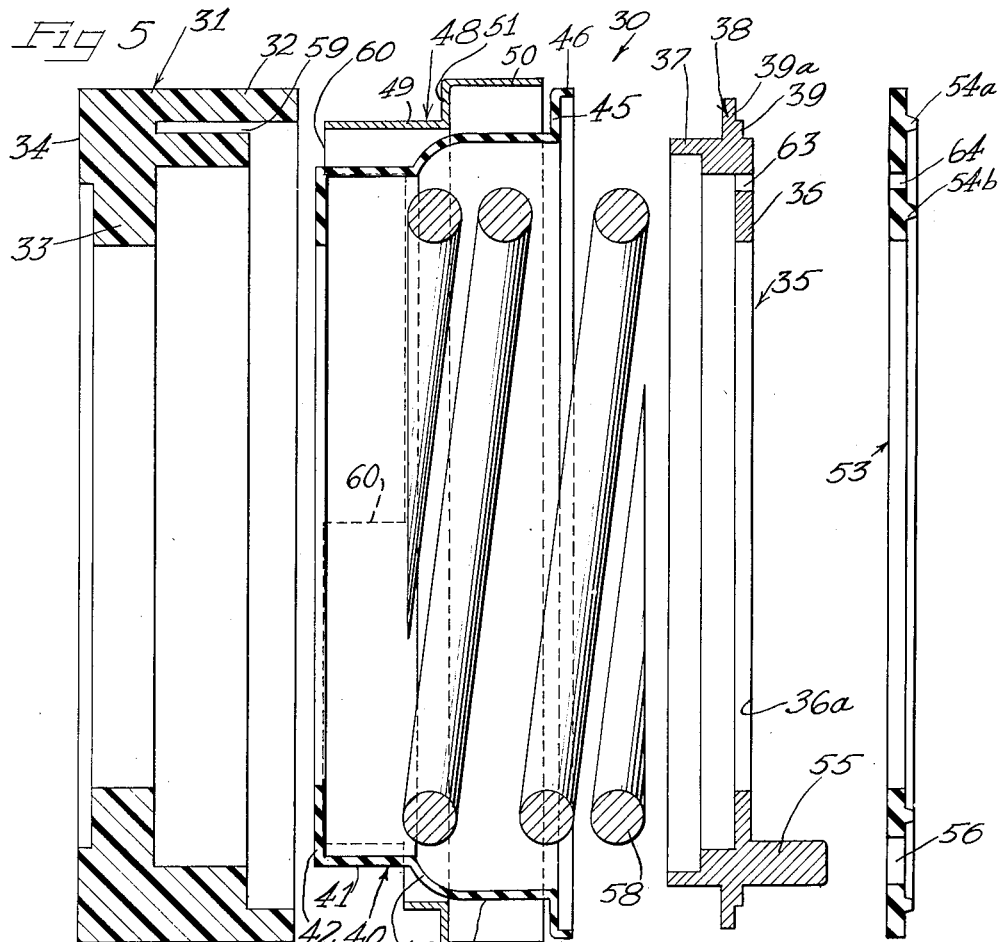
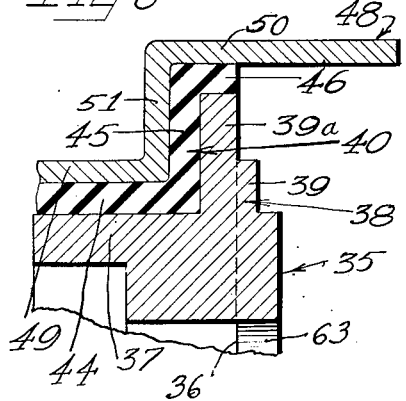
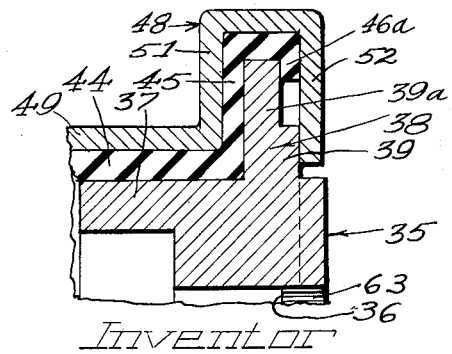
Inventor
Robert M. Beak
By Hill, Sherman, Meroni, Gross & Simpson
Attys United States Patent Office 2,760,793
Patented Aug. 28, 1956

2,760,793

FACE SEAL

Robert M. Beak, Wheaton, Ill.

Application May 11, 1953, Serial No. 354,189

2 Claims. (Cl. 286—11)

This invention relates to a lubricant retaining means and more specifically to a face sealing device for sealing a bearing against ingress of dirt and loss of lubricant.

In the present invention, a novel type lubrication face sealing assembly having a pair of end sealing members is utilized for providing face-to-face contact between a pair of relatively rotatable opposed surfaces. The sealing members are urged into sealing engagement with the opposed surfaces by a resilient thrust force. A flexible imperforate tubular member provides an axially expansible seal between the sealing members.

Heretofore, in the operation of a composite sealing assembly of this general type, an excessive lubricant pressure within the face sealing assembly has been known to break the continuity of the flexible tubular seal member, as by disrupting it or displacing it from sealing engagement with the end sealing members. The present invention provides an improved sealing assembly for avoiding this difficulty. Herein, a novel lock or retainer member is utilized to permanently clamp the tubular sealing member to one of the end sealing members to provide a fluid and air tight seal therebetween. Relief of excessive lubricant pressure within the face sealing assembly is effected by means of relief openings through said end sealing member. These openings provide means for the escape of the excess lubricant to the outer sealing surface of the end member, where, due to the unbalance of forces thereby caused, the lubricant unseats the end member and bleeds past the sealing surface thereof.

The employment of my novel retainer member in association with one of the end sealing members also affords a novel and improved face sealing assembly wherein torsional stressing of the tubular member is eliminated by the provision of means preventing relative turning of the end sealing members.

It is therefore an important object of the present invention to provide an effective and sturdy face seal.

Another object of the present invention is to provide an improved face seal assembly including a pair of end sealing members with tubular axially expansible means joining said end members and so arranged as to maintain a constantly sealed relation therebetween.

A further object of the present invention is to provide an improved method for permanently securing a flexible boot or tube to an end sealing member of a face seal assembly.

Other objects, features and advantages of the present invention will be readily apparent from the following detailed description of a preferred embodiment thereof taken in conjunction with the accompanying drawings, in which:

Figure 1 is a front elevational view partly in section of a roller assembly embodying features of the present invention;

Figure 2 is an enlarged front sectional view of a face seal assembly shown in Figure 1;

Fig. 3 is an enlarged end elevational view of a sealing gasket shown in Figure 1;

Figure 4 is an enlarged end elevational view of a face sealing member shown in Figure 1;

Figure 5 is an exploded view of the face sealing assembly;

Figure 6 is an enlarged detail view showing a portion of a sealing tube member before it is attached to a sealing member; and Figure 7 is an enlarged detail view showing the sealing tube member permanently connected to the sealing member.

As shown on the drawings:

A face sealing assembly 30 of my invention is shown for illustration purposes in connection with a roller assembly 10. However, it is to be understood that my face sealing assembly is adapted for use in association with other and differently constructed mechanisms. In general, my device may be used wherever it is desired to provide a seal between relatively rotating opposed surfaces having generally planar annular portions.

The roller assembly 10 comprises a wheel or pulley 11 rotatably mounted on a shaft or axle 12 which is fixedly supported at each end in a seal housing or cover plate 13 having a mounted flange 14. A metal bearing 14a for the shaft is lubricated through a suitable grease gun fitting 15 in one of the seal housings 13.

The shaft 12 comprises a large diameter portion 16 and successively smaller diameter portions 17 and 18, providing therebetween axially inner and outer shoulders 19 and 20, respectively.

Attached to the outer face of the hub of the wheel 11 by means of bolts 22 is an annular face plate 24. A gasket 23 is clamped between the face plate and the wheel to prevent leakage of lubricant radially outwardly thereof. The face plate 24 freely receives the reduced diameter shaft portion 17 to overlie the shoulder 19.

Each housing 13 includes a cup-shaped body wall 25 provided with an axial bore 26 for receiving the shaft end 18, to the threaded end 21 of which it is secured by means of a nut 27. The inner peripheral edge of the housing wall 25 encloses the face plate 24 but is spaced therefrom and from the hub face of the wheel 11. The housing has an upwardly facing tubular projection or cylindrical wall 28 which also terminates in spaced relation to the face plate 24. Said wall 28 terminates in a radially extending annular shoulder 29, which abuts against the outer shoulder 20 of the shaft.

In accordance with my invention, a seal assembly, indicated generally by the reference numeral 30 is provided for sealing the bearing 14a against the ingress of foreign matter and against any loss of lubricant. Said seal assembly 30 is disposed in the annular space provided around the shaft portion 17 between the face plate 24, the shoulder 29 and the cylindrical wall 28 of the housing.

The assembly 30 includes an end member 31 which is annular in form and which is suitably formed of self-lubricating material, such as "Bakelite" or hard rubber impregnated with graphite. This is for the reason that the member 31 seals against the relatively rotatable face plate 24. For this purpose, the member 31 is formed with a plane annular face 34 for bearing against the face plate 24. Said member 31 also has a cylindrical portion 32 and a radially inwardly turned annular portion 33. The latter freely receives the shaft portion 17 when the seal assembly 30 is positioned in place on said shaft.

A second end member 35 is provided for positioning freely about the shaft portion 17 in fixed relation to the shoulder 29. Said member 35 is suitably formed of metal or other rigid material and is annular in form, with an inturned flange 36 providing a generally planar outer face 36a (Fig. 5).

Projecting axially inwardly from the flange 36 is a short cylindrical wall 37 having an outer diameter less than the outer diameter of the face sealing wall 32 but slightly greater than the inner diameter of the wall 32. A collar flange 38 extends radially outwardly from the wall 37 and has a diameter slightly less than the outer diameter of the face sealing wall 32. The flange 38 has a root portion 39 and a relatively thinner peripheral portion 39a.

An effective seal between the face sealing member 31 and the member 35 is provided by means of a flexible imperforate tube or boot 40. The boot 40 comprises a molded rubber tubing having at its inner end a cylindrical wall 41 terminating in an annular inturned flange 42 which conformably fits against the juncture of the inner cylindrical surface of the face sealing wall 32 with the flange 33. The tube 40 has an intermediate section 43 which is outwardly bowed and merges into a cylindrical section 44 that overlies the cylindrical wall 37 of the member 35. Projecting radially outwardly from the cylindrical section 44 is an outturned annular flange 45 terminating in a cylindrical lip 46, the flange 45 and lip 46 conforming to and nesting against the collar flange 38 of the annular member 35.

For the purpose of securing the rubber tubing 40 to the annular member 35, there is provided a mechanical lock or retainer ring member 48 made from any suitable thin gauge sheet metal capable of being spun or die-shaped, such as stainless steel, brass, or the like. Preferably, as illustrated in Figures 5, 6 and 7, the retainer member is initially formed to a generally tubular shape having end cylindrical portions 49 and 50 of different diameters joined by an intermediate portion 51 extending in a generally radial direction. As best shown in Figure 6, the retainer member 48 is dimensioned to nest against the rubber boot 40 so that the smaller diameter cylindrical portion 49 overlies the cylindrical boot section 44 and the larger diameter cylindrical portion 50 overlies the cylindrical lip 46 of the rubber boot.

As a preliminary step in their assembly, the rubber tube 40 and the member 35 are arranged to receive the retainer member 48. Referring to Figure 6, which illustrates the initial stage of assembly, the axially outer end portion of the boot 40 is disposed in overlying and nesting relation to the collar flange 38 of the member 35 with the edge of the lip 46 lying flush with the outer face of the collar flange portion 39a. Accordingly, when the retainer member 48 is applied by generally nesting it against the outer end portion of the rubber boot, the terminal cylindrical portion 50 will overhang the member 35.

Permanent locking engagement may be effected by folding the terminal portion 50 to form inturned end or flange 52, as by means of a shaping die or the like, to a position in abutment with the collar flange portion 39 of the member 35, as illustrated in Figure 7. Thereby, the inturned end 52 acts to compress the tube flange 45 and lip 46, and the tube 40 is grippingly held in retaining engagement with the member 35.

It will be appreciated that by virtue of the inherent incompressibility of rubber, the pressure exerted upon the rubber tube by the retainer member 48 will distort the rubber tube end and cause a consequent decrease in thickness thereof, while at the same time causing a cold flow of rubber material lengthwise into the space defined by the inturned end 52 of the retainer member 48 and the flange portion 39a. As best seen in Figure 7, which illustrates the condition that obtains after forming the mechanical lock in place, an additional flange 46a is formed at the end of lip 46, which effectively aids in the retention of the rubber tube 40 on the annular member 35. It will be appreciated that the inturned flange 52 or the collar flange 39 may be preformed with various configurations of grooves to further increase the locking effect of the lip 46a.

It will be noted that in its final form, the inturned flange 52 of the retaining member 48 is adapted to lie flush with the axially outwardly facing side of the flange 36 to form therewith a flat surface for receiving an annular ring sealing member 53.

The sealing member 53 may be made from synthetic rubber or other suitable lubricant sealing material. When the sealing assembly 30 is in position, the sealing member 53 encircles the shaft portion 17 and lies between and in contact with the annular member 35 and the shoulder 29 of the housing 13. The sealing member 53 is provided with concentric sealing beads 54a and 54b which project slightly from the axially outer face of the sealing member for sealing engagement with the shoulder 29.

The member 35, sealing member 53 and housing 13 are interlocked for preventing relative rotation therebetween by providing the member 35 with projections or studs 55 extending through registering openings 56 in the ring seal 53 (see Fig. 4) into sockets 57 in the shoulder 29 (see Fig. 1). The studs 55 may be disposed in any spaced pattern that may be desired, three being shown in the illustrative embodiment, although a larger or smaller number may be used depending on size and service requirements.

In the present instance, means are provided for constantly urging the face sealing member 31 and the ring sealing member 53 into respective engagement with the face plate 24 of the roller assembly and the shoulder 29 of the housing. For this purpose, a helically coiled spring 58 is positioned under compression within the rubber sealing tube 40 between the spring retaining seats defined by the axially inner surface of the flange 36 and the inturned flange 42 of the rubber tubing 40. The spring 58 constantly urges the face sealing member 31 into positive sealing engagement with the face plate 24.

Means are provided for preventing the face sealing member 31 from turning with the face plate 24, since such turning would tend to twist and rupture the rubber sealing tube 40. To this end, a plurality of recessed arcuate slots 59 are provided in the cylindrical wall 32 of the face sealing member 31, and registering arcuate finger extensions 60 are formed integrally with the inner cylindrical portion 49 of the retaining member 48. Thereby, the face sealing member 31 and the ring seal carrying annular member 35 may move axially toward or away from each other, but relative rotational movement is avoided because of the engagement of the fingers 60 in the slots 59. Any suitable number of fingers or slots may be used, three being illustrated in Figures 2, 4 and 5.

To allow free flexing of the intermediate tube wall 43 of the rubber tubing as the seal face assembly is axially contracted, the inner wall of the face sealing member 31 is recessed to provide an intermediate cylinder wall 61 of larger diameter than the inner diameter of cylindrical wall 32.

In the event that the permissive grease gun pressure in the wheel bearing is exceeded, lubricant will flow through relief openings 63 provided in the flange 36 and registering openings 64 in the ring seal 53, and unseat the beads 54a and 54b from sealing engagement with the shoulder face 29 so as to relieve the pressure.

In operation, lubricant is supplied to the grease gun fitting 15 to provide a flow of lubricant past the bearing 14a and into the face sealing assembly 30. The operator need only supply enough lubricant to fill the face sealing assembly. In this situation, the opposed internal areas of the face sealing member 31 and the member 35 are approximately equal. Thus the forces set up by the grease gun pressure on the inside surfaces of the seal assembly are substantially equalized and there is no tendency for the ring seal 53 to be unseated.

However, in practice, the operator of the grease gun will often continue to supply lubricant until he can see the excess lubricant spurt from the seal housing 13, just to satisfy himself of an adequate supply of lubricant. For this to occur, the excess lubricant pressure must have caused lubricant to flow through the registering relief openings 63, 64, and by acting against the outer annular face of the ring seal 53 between the concentric beads, 54a and 54b, to have unseated the beads. As the pressure of the lubricant is increased, the differential force exerted is sufficient to compress the spring 58 and unseat the ring 53, thereby allowing the lubricant to bleed past the sealing beads 54a and 54b.

When the pressure has decreased to within the safety range, the spring 58 will force the ring seal back into sealing engagement with the surface 29.

It will be understood that modifications and variations may be effected without departing from the scope of the novel concepts of the present invention.

I claim as my invention:

1. A face seal assembly for effecting a seal between opposed relatively rotating surfaces and surrounding a shaft to provide a lubricant chamber around said shaft and between said surfaces, said assembly comprising a pair of annular sealing members for face-to-face contact with said surfaces, respectively, a flexible imperforate tubular member joining said sealing members and lockingly united at one end to one of said sealing members, said tubular member having a radially inwardly directed flange at its other end, and resilient means within said tubular member and acting against said flange and said one sealing member for urging said sealing members apart and simultaneously forcing the flange of said tubular member against the other of said sealing members, at least one of said sealing members having radially spaced concentric sealing beads and pressure relief apertures between said sealing beads and extending from inside said chamber to the respective surface outside said chamber.

2. A face sealing assembly for effecting a seal between opposed relatively rotating surfaces and surrounding a lubricated shaft to provide a lubricant chamber around said shaft, said assembly comprising a pair of annular sealing members for face-to-face contact with said surfaces, respectively, a flexible imperforate tubular member providing a seal between said sealing members, means securing said tubuar member in sealing engagement with each of said sealing members, said securing means including spring means within said tubular member and between said sealing members urging said sealing members into sealing engagement with said surfaces, one of said sealing members including a sealing gasket having radially spaced concentric sealing beads for sealing engagement with its associated surface, a plurality of lubricant pressure relief openings in said one sealing member, a plurality of openings in said sealing gasket in registry with said relief openings and affording communication from said lubricant chamber to the space between said sealing beads, whereby excess lubricant pressure in said chamber may be relieved by allowing excess lubricant to bleed out through said relief openings and between said sealing beads and their associated surface.

References Cited in the file of this patent

UNITED STATES PATENTS

| | | |
|---|---|---|
| 480,643 | Welsh | Aug. 9, 1892 |
| 1,085,326 | Dahlke | Jan. 27, 1914 |
| 1,956,366 | Vedovell | Apr. 24, 1934 |
| 2,133,487 | Spargo | Oct. 18, 1938 |
| 2,301,723 | Vedovell | Nov. 10, 1942 |
| 2,379,868 | Curtis | July 10, 1945 |
| 2,444,713 | Solari | July 6, 1948 |
| 2,491,233 | Vedovell | Dec. 13, 1949 |
| 2,610,871 | Woodson | Sept. 16, 1952 |

FOREIGN PATENTS

| | | |
|---|---|---|
| 372,213 | Italy | June 20, 1939 |